United States Patent
Bae

[11] Patent Number: 5,926,327
[45] Date of Patent: Jul. 20, 1999

[54] OBJECTIVE LENS DRIVING DEVICE FOR AN OPTICAL PICK-UP UNIT

[75] Inventor: Jung-kook Bae, Suwon, Rep. of Korea

[73] Assignee: Samsung Electronics Co., Ltd., Kyungki-do, Rep. of Korea

[21] Appl. No.: 09/069,113

[22] Filed: Apr. 29, 1998

[30] Foreign Application Priority Data

Aug. 27, 1997 [KR] Rep. of Korea ...................... 97-23396

[51] Int. Cl.⁶ ..................................................... G02B 7/02
[52] U.S. Cl. ......................... 359/824; 359/813; 359/814; 369/44.15
[58] Field of Search .................................... 359/811, 813, 359/814, 824; 369/44.15, 44.16

[56] References Cited

U.S. PATENT DOCUMENTS

| | | | |
|---|---|---|---|
| 4,669,823 | 6/1987 | Iguma et al. | 359/814 |
| 4,702,555 | 10/1987 | Iguma et al. | 359/814 |
| 5,208,703 | 5/1993 | Ikegame et al. | 359/813 |
| 5,566,149 | 10/1996 | Song | 369/44.15 |

FOREIGN PATENT DOCUMENTS 8-147730  6/1996  Japan.

*Primary Examiner*—Loha Ben
*Attorney, Agent, or Firm*—Sughrue, Mion, Zinn, Macpeak & Seas, PLLC

[57] ABSTRACT

An objective lens driving device including a base, a permanent magnet and a yoke installed on the base for forming a magnetic circuit, a holder fixed on the base and having electrical terminals at a side thereof, a movable supporter on which an objective lens is mounted and which is provided with focusing and tracking coils, first and second protrusions provided at the sides of the movable supporter and around which lead wires of the tracking coil and the focusing coil are wound respectively, and suspension members for supporting the movable supporter. The suspension members electrically connect the focusing coil and the tracking coil with respective control signal sources, one end of each of the suspensions being fixed to the holder and being electrically connected to the corresponding electrical terminals and the other end being electrically connected to corresponding ends of the lead wires wound around the first and second protrusions.

4 Claims, 3 Drawing Sheets

OBJECTIVE LENS DRIVING DEVICE FOR AN OPTICAL PICK-UP UNIT

BACKGROUND OF THE INVENTION

1. Field of the Invention

The present invention relates to an objective lens driving device for an optical pick-up unit, and more particularly, to an objective lens driving device for an optical pick-up unit having an improved structure to facilitate installation of electrical connections between a control signal source and focusing and tracking coils.

2. Description of the Related Art

Generally, in optical recording/reproducing units using an optical disk, such as a laser disk player, a compact disk player or the like, an optical pick-up unit is installed for irradiating an optical beam onto a disk surface and detecting the optical beam reflected from the disk surface. The optical pick-up unit detects the optical beam reflected from the disk surface in the form of binary signals. For successful reproducing of recorded information, the beam focused onto the optical disk should be precise, and the focused beam should accurately trace the tracks formed on the optical disk. Driving an objective lens to adjust the focus position of the beam in the direction of the optical axis is usually referred to as "focusing", and driving the objective lens to adjust the focus position of the beam in the radial direction in order for the beam to accurately trace the tracks is usually referred to as "tracking". The optical pick-up unit employs devices for driving the objective lens in order to perform both focusing and tracking.

Referring to FIG. 1 which shows a conventional objective lens driving device, a movable supporter 1 carrying an objective lens 2 is supported by elastic suspensions 5 extending from a holder 3 fixed on a base 4. A focusing coil 6 and a tracking coil 7 are installed on the movable supporter 1. Once a control current is fed into the focusing coil 6 or the tracking coil 7, a magnetic field is generated by the focusing coil 6 or the tracking coil 7. This magnetic field interacts with the magnetic field of a permanent magnet 8a and a yoke 8b which are fixed on the base 4, and accordingly, the movable supporter 1 moves vertically or horizontally. The focusing coil 6 and the tracking coil 7 are supplied with a control current via a circuit board 9.

In order to assemble the objective lens driving device having the structure described above, since the circuit board 9 is assembled to the movable supporter 1, and since the leads 5a and 6a from the focusing coil 6 and the tracking coil 7 must be soldered respectively to connection portions of the circuit board 9, there are problems in that the assembly process is difficult and the automatization of the assembly process is difficult as well.

SUMMARY OF THE INVENTION

To solve the above problems, it is an object of the present invention to provide an objective lens driving device having an improved structure to facilitate the assembly of electrical connections between a control signal source and focusing and tracking coils.

Accordingly, to achieve the above object, there is provided an objective lens driving device comprising a base, a permanent magnet and a yoke which are installed on the base for forming a magnetic field, a holder fixed on the base and provided with electrical terminals at a side thereof, a movable supporter on which an objective lens is mounted and which is provided with focusing and tracking coils, first and second protrusions formed on the movable supporter and around which lead wires of the tracking coil and the focusing coil are wound respectively, and a plurality of suspensions for supporting the movable supporter, and for electrically connecting the focusing coil and the tracking coil with a control signal source, respectively, one end of each of the suspensions being fixed to the holder and being electrically connected to the corresponding electrical terminals and the other end being electrically connected to the corresponding end of the lead wires wound around the first and second protrusions.

In addition, the movable supporter comprises a first movable supporter to which the objective lens and the tracking coil are installed and which is provided with the first protrusions for the lead wires of the tracking coil to be wound around, and a second movable supporter to which the focusing coil is installed and which is secured to the first movable supporter and provided with the second protrusions for the lead wires of the focusing coil to be wound around.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 2:
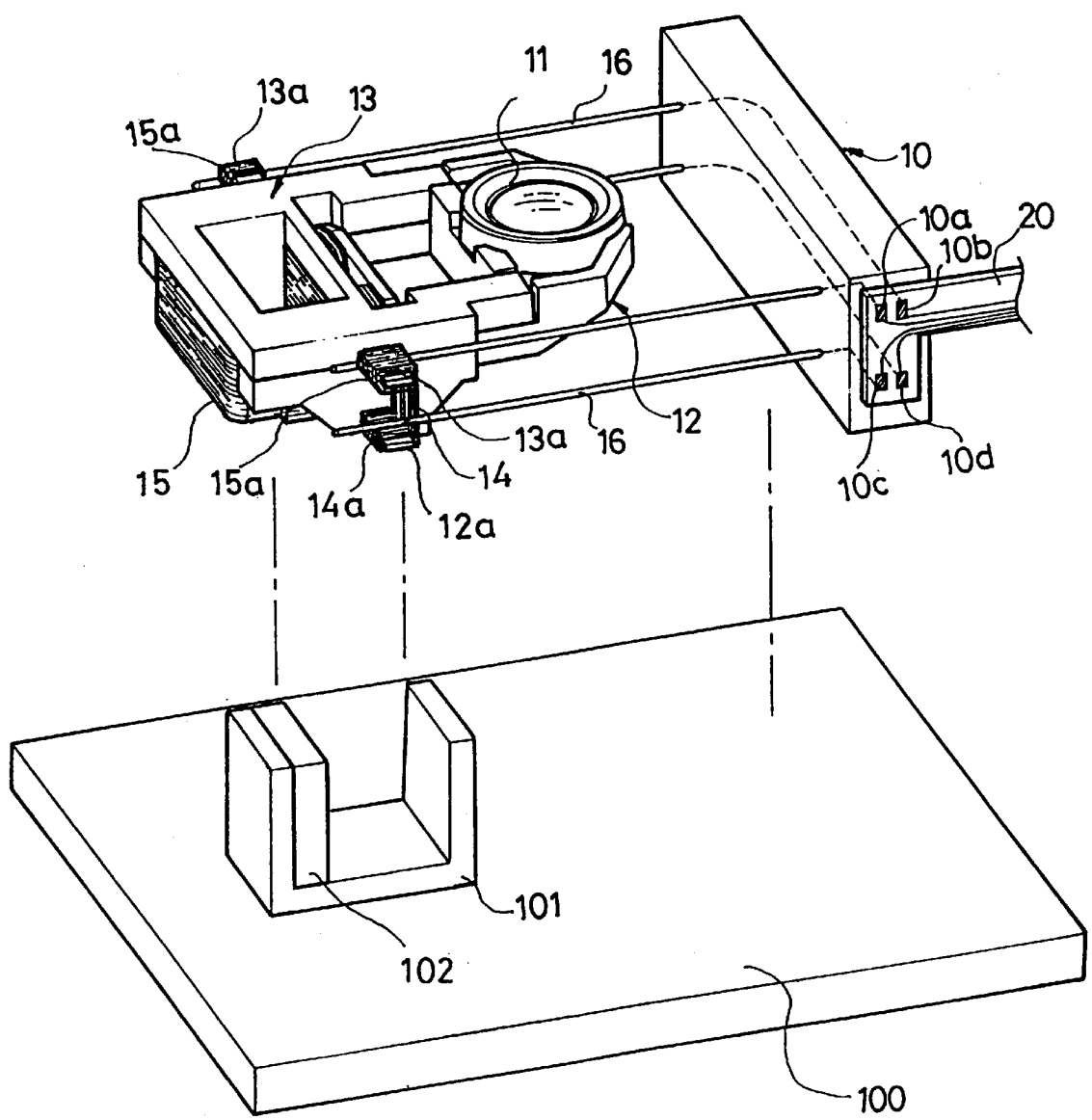
FIG. 2 is a partially exploded perspective view illustrating an embodiment of an objective lens driving device of an optical pick-up unit according to the present invention.

Referring to FIG. 2, in a preferred embodiment of an objective lens driving device according to the present invention, a permanent magnet 102 and a yoke 101 for forming a magnetic circuit are fixed on a base 100. A holder 10 provided with electrical terminals 10a through 10d at a side thereof is fixed on the base 100, and a first movable supporter 12 and a second movable supporter 13 are supported by elastic suspensions or suspension members 16, one end of each being fixed to the holder 10. By way of example, the one end of each elastic suspension 16 can be inserted into respective holes formed in the holder 10.

Figure 3:
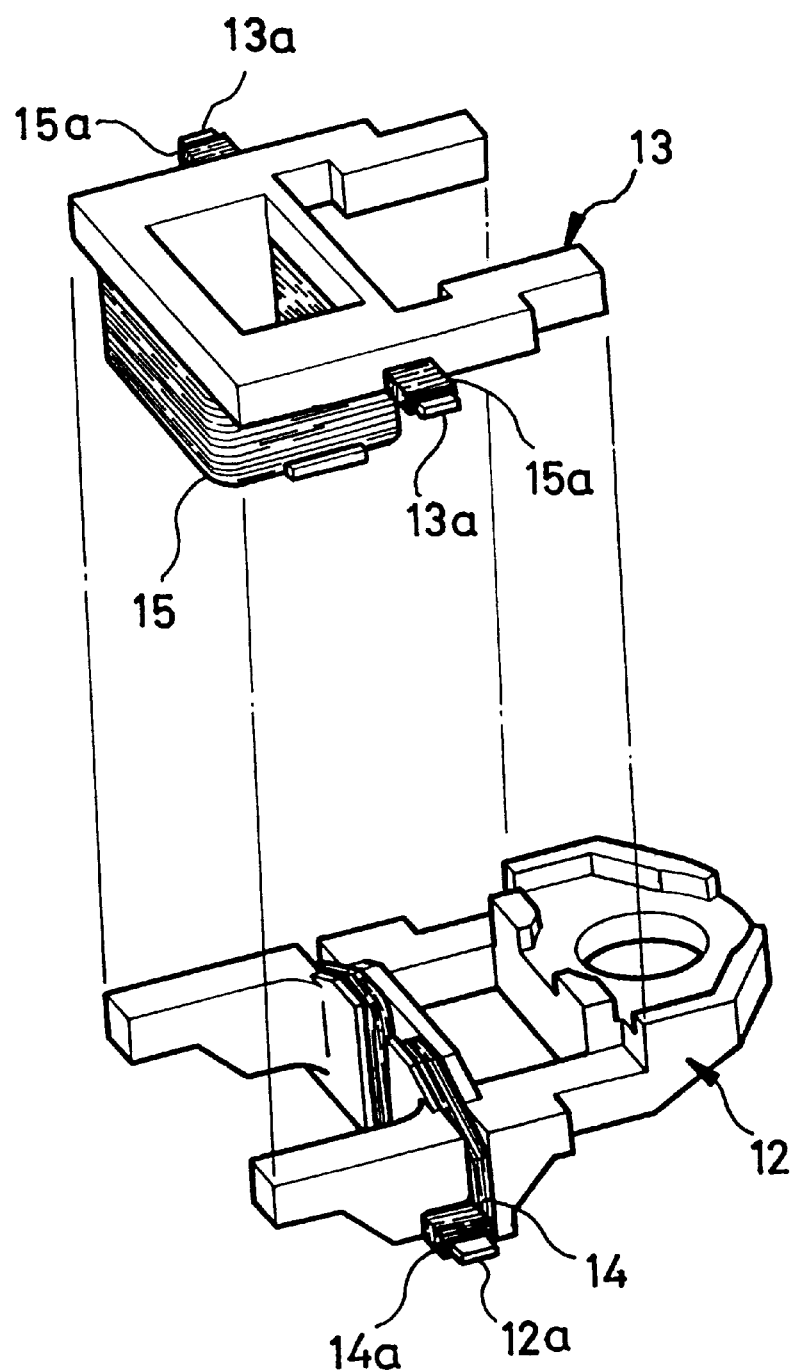
FIG. 3 is an exploded perspective view of the first and second movable support shown in FIG. 2.

As shown in FIG. 3, the first movable supporter 12 and the second movable supporter 13 can be separated, and may be bonded by an adhesive at the time of assembly. An objective lens 11 is mounted on the first movable supporter 12 and a tracking coil 14 is also installed on the first movable supporter 12. A focusing coil 15 is installed on the second movable supporter 13.

A pair of first protrusions 12a around which lead wires 14a of the tracking coil 14 are wound are formed at both sides of the first movable supporter 12 and a pair of second protrusions 13a around which lead wires 15a of the focusing coil 15 are wound are formed at both sides of the second movable supporter 13. One end of each elastic suspension 16 fixed to the holder 10 is electrically connected to the respective electrical terminals 10a through 10d, and the other end is soldered to corresponding ends of the lead wires 14a and 15a, respectively wound around the first and second protrusions 12a and 13a. By way of example, electrical wires (not shown) can be embedded in the holder 10 to connect the end of each elastic suspension 16 to the respective electrical terminals 10a through 10d.

The elastic suspensions 16 are made of a material which has electrical conductivity and elasticity, such as steel for example. The elastic suspensions 16 are shown in the drawing figures as being rod shaped, but they can have any cross sectional shape.

Reference numeral 20 denotes lines connecting the electrical terminals 10a through 10d with a control signal source (not shown).

When the objective lens driving device having the structure described above is assembled, the tracking coil 14 is wound by a conventional coil winding machine around a part of the first movable supporter 12 on which the objective lens 11 is mounted, and then the lead wires 14a of the tracking coil 14 are wound around the first protrusions 12a. In a similar manner, the focusing coil 15 is wound around a part of the second movable supporter 13 and the lead wires of the focusing coil 15 are wound around the second protrusions 13a. Subsequently, the first and second movable supporters 12 and 13 are bonded.

Then, after one end of each elastic suspension 16 is fixed to the holder 10 which is fixed on the base 100, the other end of each elastic suspension 16 is soldered to corresponding ends of lead wires 14a and 15a wound around the first and second protrusions 12a and 13a, respectively. Hence, the current supplied to the electrical terminals 10a through 10d can be supplied to the tracking coil 14 and the focusing coil 15 via the elastic suspensions 16. In addition, the first and second movable supporters 12 and 13 are elastically supported by the elastic suspensions 16, and are movable horizontally and vertically with respect to the holder 10.

Figure 1:
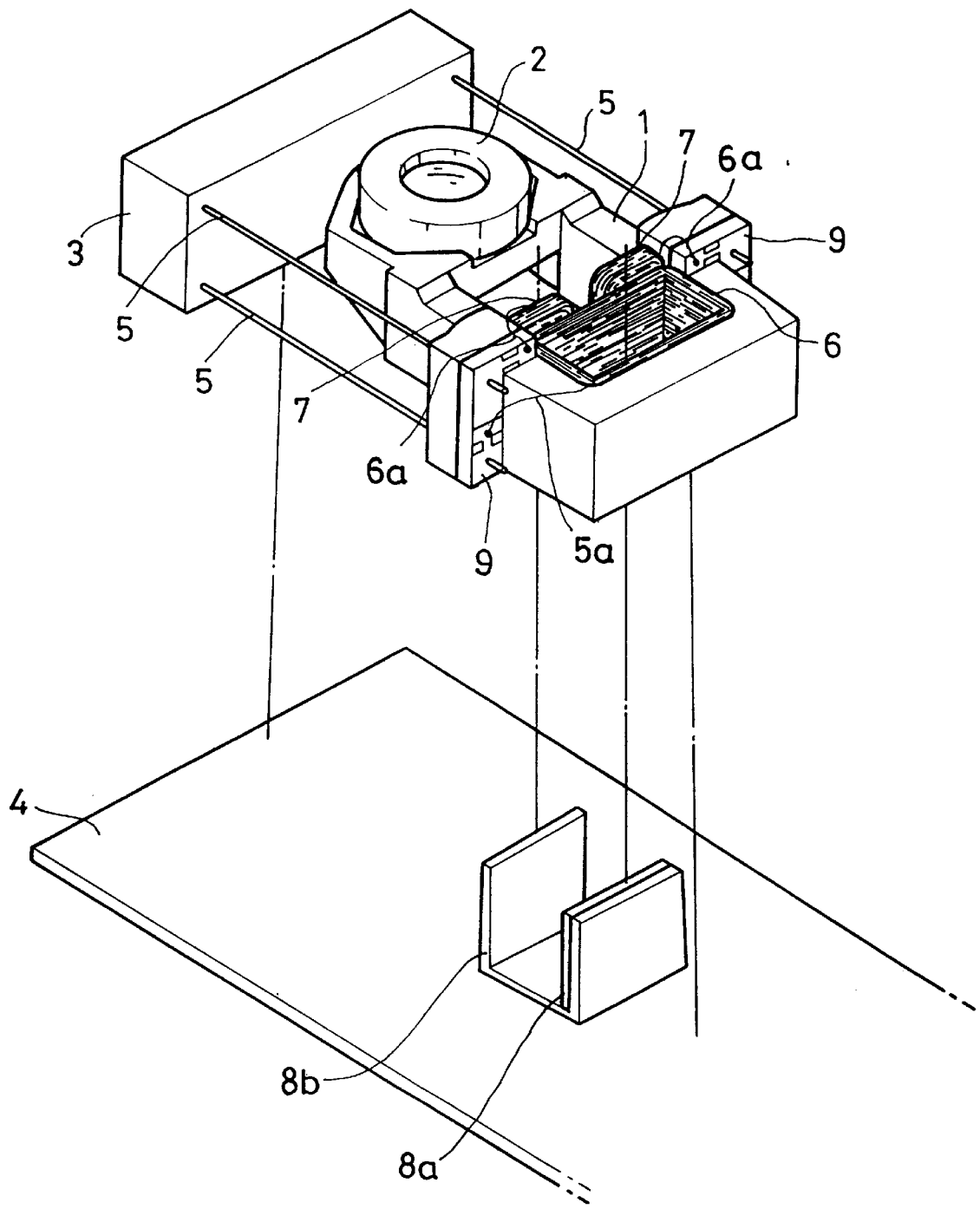
FIG. 1 is a partially exploded perspective view illustrating a conventional objective lens driving device of an optical pick-up unit.

In the assembly process of the objective lens driving device according to the present invention, the electrical connections between the control signal source and the tracking and focusing coils can be performed with ease. There is no need to solder the lead wires of the tracking and focusing coils to the connection portions of the circuit board 9 (see FIG. 1) as in the conventional driving device. Instead, the lead wires 14a and 15a are simply wound around the first and second protrusions 12a and 13a, and soldered respectively to the suspensions 16. The assembly process can be performed by an automated system instead of by manual labor.

In addition, there is no need to install the separately prepared circuit board 9 (see FIG. 1) for electrically connecting the tracking coil and the focusing coil with the control signal source.

It should be understood that various changes and modifications to the preferred embodiment described herein will be apparent to those of ordinary skill in the art. Changes and modifications may be made without departing from the spirit and scope of the present invention, and without diminishing its attendant advantages. Thus, it is intended that such changes and modifications be covered by the appended claims.

What is claimed is:

1. An objective lens driving device, comprising:

a base;

a permanent magnet and a yoke which are installed on said base for forming a magnetic field;

a holder fixed on said base and having electrical terminals at a portion thereof;

a movable supporter and an objective lens mounted on said movable supporter, and a focusing coil and a tracking coil provided on said movable supporter;

first protrusions and second protrusions formed on said movable supporter, wherein said focusing coil and said tracking coil have lead wires wound respectively around said first protrusions and said second protrusions; and a plurality of electrically conductive, elastic suspension members for supporting said movable supporter, one end of each of said suspension members being fixed to said holder and electrically connected to corresponding ones of said electrical terminals, and the other end of each of said suspension members being electrically connected to corresponding ones of said lead wires wound around said first protrusions and said second protrusions.

2. The objective lens driving device as claimed in claim 1, wherein the other end of each of said suspension members is electrically connected to the corresponding ones of said lead wires by a solder connection.

3. The objective lens driving device as claimed in claim 1, wherein said first protrusions are formed on opposite sides of said movable supporter, and wherein said second protrusions are formed on opposite sides of said movable supporter.

4. An objective lens driving device, comprising:

a base;

a permanent magnet and a yoke which are installed on said base for forming a magnetic field;

a holder fixed on said base and having electrical terminals at a portion thereof;

a movable supporter and an objective lens mounted on said movable supporter, and a focusing coil and a tracking coil provided on said movable supporter:

first protrusions and second protrusions formed on said movable supporter, wherein said focusing coil and said tracking coil have lead wires wound respectively around said first protrusions and said second protrusions; and a plurality of electrically conductive, elastic suspension members for supporting said movable supporter, one end of each of said suspension members being fixed to said holder and electrically connected to corresponding ones of said electrical terminals, and the other end of each of said suspension members being electrically connected to corresponding ones of said lead wires wound around said first protrusions and said second protrusions, wherein said movable supporter comprises:

a first movable supporter on which said objective lens and said tracking coil are installed, said first movable supporter being provided with said first protrusions around which the lead wires of said tracking coil are wound; and a second movable supporter on which said focusing coil is installed, said second movable supporter being secured to said first movable supporter, and said second movable supporter being provided with said second protrusions around which the lead wires of said focusing coil are wound.

* * * * *